United States Patent [19]
Bretschneider et al.

[11] 3,860,724
[45] Jan. 14, 1975

[54] SUBSTITUTED SULFONYL UREA AND ITS STEREOISOMERS AS HYPOGLYCEMIC AGENTS

[75] Inventors: Hermann Bretschneider; Klaus Grassmayr; Kraft Hohenlohe-Oehringen, all of Innsbruck, Austria; Andre Grussner, Basel, Switzerland

[73] Assignee: Hoffmann-La Roche Inc., Nutley, N.J.

[22] Filed: Oct. 10, 1973

[21] Appl. No.: 404,955

Related U.S. Application Data

[60] Division of Ser. No. 184,902, Sept. 29, 1971, Pat. No. 3,787,491, which is a continuation-in-part of Ser. No. 675,796, Oct. 17, 1967, abandoned.

[52] U.S. Cl. ................................ 424/321, 424/322

[51] Int. Cl. ........................................... A61k 27/00
[58] Field of Search ............................ 424/321, 322

[56] References Cited
UNITED STATES PATENTS
3,352,884  11/1967  Fonken et al. .................... 260/553

Primary Examiner—Frederick E. Waddell
Attorney, Agent, or Firm—Samuel L. Welt; Bernard S. Leon; William G. Isgro

[57] ABSTRACT

A hypoglycemic agent, 1-(p-toluenesulfonyl)-3-(2-hydroxy-3-bornyl)-urea, is prepared, for example, from tosyl ethyl urethane and 3-amino-borneol or 3-amino-isoborneol. One of the isomers, i.e., 1-[(1R)-2-endo-hydroxy-3-endo-bornyl]-3-(p-tolylsulfonyl)-urea, is particularly useful as a hypoglycemic agent.

2 Claims, No Drawings

SUBSTITUTED SULFONYL UREA AND ITS STEREOISOMERS AS HYPOGLYCEMIC AGENTS

CROSS-REFERENCE TO RELATED APPLICATIONS

This is a division, of application Ser. No. 184,902 filed Sept. 29, 1971, which is now U.S. Pat.No. 3,787,491 patented Jan. 22, 1974 which in turn is a continuation-in-part of application Ser. No. 675,796, filed Oct. 17, 1967, now abandoned.

References applied by the Patent Office in U.S. Pat. application Ser. No. 675,796 are:
U.S. Pat. No. 3,352,884;
U.S. Pat. No. 3,334,302; and
U.S. Pat. No. 2,968,158.
Other U.S. Pats. which show the state of the art are:
U.S. Pat. No. 2,928,871; and
U.S. Pat. No. 3,155,726.

BACKGROUND OF THE INVENTION

It is known that select compounds belonging to the class of benzene sulfonylureas are capable of lowering the blood sugar value in warm-blooded animals. A benzene-sulfonylurea which is presently in wide commercial use as a hypoglycemic agent, i.e., tolbutamide, is described in U.S. Pat. No. 2,968,158. The recommended daily dose for tolbutamide ranges from 250 mg. to as much as 3,000 mg. daily. Obviously, the advantages in providing a hypoglycemic agent which can function at least as efficaciously as tolbutamide at a substantially lower daily dosage regimen are apparent.

The present invention provides a hydroxybornyl-tolylsulfonylurea which lowers the blood sugar values in warm-blooded animals and yet achieves this highly gainful result at significantly lower dosage amounts than are required for maintenance by a tolbutamide regimen. The hydroxybornyl-tolysulfonylurea derivative of the present invention is characterized by the lack of undesirable side effects such as nausea, emesis and lower abdominal problems, as well as having very low toxicity. Also, because the toxicity of the compounds of the present invention is lower than tolbutamide and the daily dosage regimen is also very low, the therapeutic index thereof is extremely favorable when compared with tolbutamide, particularly with respect to the preferred 1-[(1R)-2-endo-hydroxy-3-endo-bornyl]-3-(p-tolylsulfonyl)-urea of the invention.

BRIEF DESCRIPTION OF THE INVENTION

In one aspect the invention relates to a 1-(p-toluenesulfonyl)-3-(2-hydroxy-3-bornyl)-urea of the formula

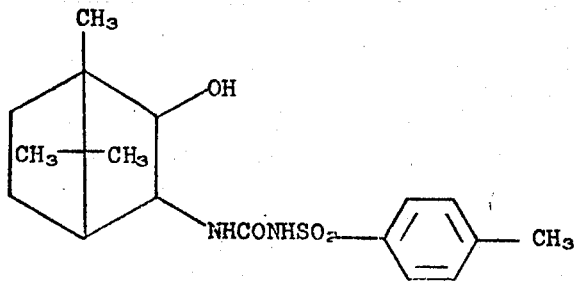

and, particularly, the 1[(1R)-2-endo-hydroxy-3-enodbornyl]-3-(p-tolylsulfonyl)-urea enantiomer, and salts thereof with pharmaceutically acceptable bases.

In another aspect, the invention relates to processes for preparing a compound of formula I.

In yet another aspect, the invention relates to a method of lowering blood sugar levels in warm-blooded animals by administering a compound of formula I.

DETAILED DESCRIPTION OF THE INVENTION

The invention relates to a 1-(p-toluenesulfonyl)-3-(2-hydroxy-3-bornyl)-urea of the formula

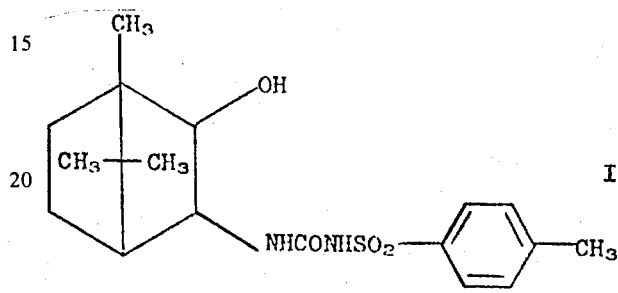

and salts thereof with pharmaceutically acceptable bases.Stated another way, the invention relates to a compound of the formula

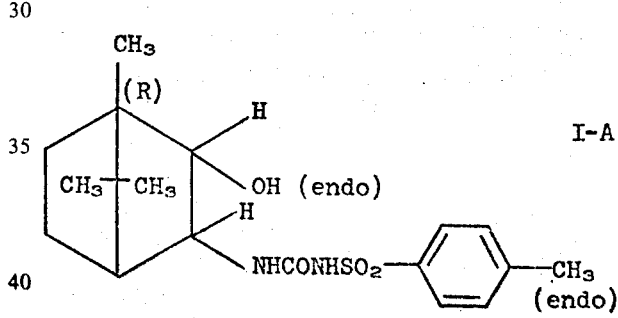

optical enantiomers, geometric isomers and racemates thereof, and acid salts thereof with pharmaceutically acceptable bases.

A preferred embodiment is 1-(p-toluenesulfonyl)-3-(2endo-hydroxy-3-endo-bornyl)-urea. The most preferred embodiment of the invention is 1-(p-toluenesulfonyl)-3-(2-endo-hydroxy-3-endo-D-bornyl)-urea, also named herein as 1-[(1R)-2-endo-hydroxy-3-endo-bornyl]-3-(p-tolylsulfonyl)-urea or (1-R)-3-endo-[3-(p-tolylsulfonyl)-ureido]-borneol.

A compound of formula I can be prepared by reacting a reactive derivative of a sulfonylcarbamic acid of the formula

I

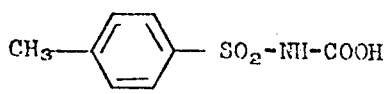 II or a sulfonylisocyanate of the formula

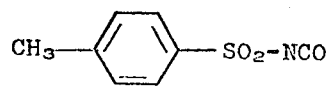 III with the corresponding bicyclic amine of the formula

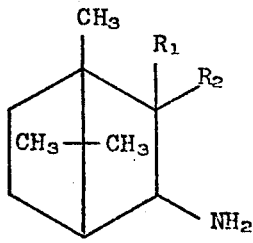 IV wherein $R_1$ is hydrogen, $R_2$ is hydroxy or $R_1$ and $R_2$, taken together are the oxygen atom of a keto group, and, when $R_1$ and $R_2$, taken together are the oxygen atom of a keto group, reducing the product bearing the ring-located keto group to the corresponding hydroxy compound. [Procedure (a)].

Another process for preparing a compound of formula I comprises reacting a salt of the amide of a compound of the formula

 V with the corresponding bicyclic isocyanate of the formula

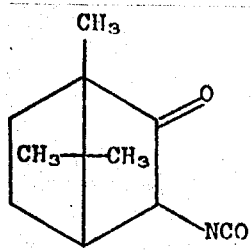 VI and reducing the product bearing the ring-located keto group to the corresponding hydroxy compound. [Procedure (b)].

Still another process for preparing a compound of formula I comprises treating the corresponding compound of the formula

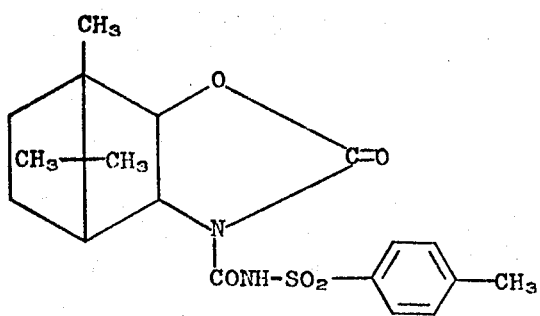 VII with an alkali metal compound, such as sodium hydroxide, potassium hydroxide or the like. [procedure (c)].

After the ring-located keto group in the reaction product obtained in accordance with procedures (a) or (b) is reduced, the isomers obtained thereby may be separated.

A compound characterized by the formula:

 IIa wherein Z is lower alkoxy, aryloxy, lower alkylthio, arylthio, imidazolyl -(1) or 3,5-di-lower alkylpyrazolyl -(1), is preferably used as the reactive sulfonylcarbamic acid derivative in process variant (a).

As used herein, the term "lower alkyl" denotes a straight chain or branched chain alkyl group containing 1–7 carbon atoms, e.g., methyl, ethyl, propyl, isopropyl, butyl, pentyl, hexyl and the like. The term "lower alkoxy" denotes lower alkyl ether groups in which the lower alkyl moiety is as defined above. The term "aryl" as used herein denotes a group such as phenyl or tolyl.

Examples of the invention are:
1-(p-toluenesulfonyl)-3-(2-endo-hydroxy-3-endobornyl)-urea;
1-(p-toluenesulfonyl)-3-(2-endo-hydroxy-3-endo-D-bornyl)-urea;
1-(p-toluenesulfonyl)-3-(2-endo-hydroxy-3-endo-L-bornyl)-urea;

A compound of formula I forms salts with pharmaceutically acceptable bases and such salts are also within the scope of this invention. Thus, a compound of formula I forms salts with pharmaceutically acceptable bases which preferably include alkali metal bases such as sodium hydroxide, potassium hydroxide and the like, or alkaline earth metal bases such as calcium hydroxide. Strong organic bases such as tetraethyl ammonium hydroxide can also be used.

In one embodiment of the process variant (a), there is used a compound of formula IIa, wherein Z is imidazolyl-(1). Conveniently, the corresponding sulfonamide (preferably as an alkali metal salt) is reacted with carbonyldiimidazole in a suitable anhydrous organic solvent which is inert to carbonyl compounds and does not contain hydroxy groups, and the sulfonylcarbamic acid imidazolide which is formed is then allowed to react in situ with a compound of formula IV. Organic solvent, for example, dimethylformamide, hydrocarbons, such as benzene and halogenated hydrocarbons, such as chloroform, are suitable for this reaction.

A ring-located keto group which may be present in the reaction product obtained can subsequently be reduced to the hydroxyl group. This can be brought about in a known manner, for example, by treatment with a complex metal hydride, such as sodium borohydride, or by catalytic hydrogenation. The geometric isomers which are obtained in the reduction can then, if desired, be separated according to known methods, for example, by crystallization or by chromatography.

According to another process of the invention, a compound of the Formula VI, is reacted with a salt of the amide of a sulfonic acid of Formula V. A salt of a strong base, for example, an alkali metal salt, such as the sodium salt, is conveniently employed. Examples of such amides are sodium p-toluenesulfonamide, potassium p-toluenesulfonamide and the like. Organic solvents of the type mentioned above which are inert to the reactants can be suitably utilized.

1-(p-toluenesulfonyl)-3-(2-hydroxy-3-bornyl)urea can exist in various configurations, for example, as a racemate or in the optically active form, depending upon the stereochemistry of the starting materials of Formulas IV or VI used in the preparative techniques described above. Especially preferred is a compound of Formula I above which is derived configuratively from DL- or D-borneol.

The starting materials for the processes of the invention can, insofar as they are not known, be manufactured according to methods which are generally known in the literature. Thus, the starting compounds of formula IV can, for example, be obtained by converting the corresponding ketone into the isonitroso ketone, for instance, by treatment with amyl nitrite and reducing the reaction product to the amino ketone, for example, by means of zinc in caustic soda. The amino ketone thus obtained can, if desired, be ketalized or reduced to the amino alcohol. The reduction of an amino ketone to the amino alcohol can, for example, be effected with sodium borohydride or by catalytic hydrogenation. The isocyanates of the Formula VI can be obtained from the corresponding amino ketones or ketals by reaction with phosgene.

A compound of Formula VII is prepared by reacting a compound characterized by the formula

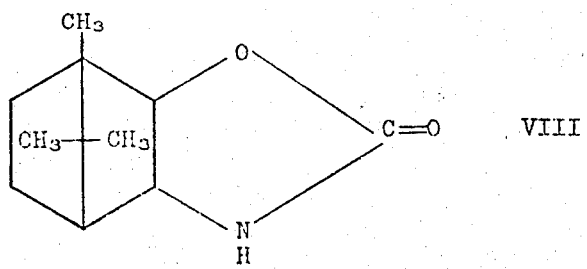 VIII with a derivative of sulfonylcarbamic acid of Formula II or with a derivative of sulfonylisocyanate of Formula III. This reaction can be carried out in the manner described above under process variant (a) for the reaction of a sulfonylcarbamic acid derivative or a sulfonylisocyanate derivative with a compound of Formula IV.

The compound of formula VIII can be prepared from the corresponding aminoalcohol, i.e., from aminoborneol and phosgene in the presence of an acid-binding agent.

Except for the starting materials whose preparation has been herein described, all other starting materials necessary for the processes of the invention are compounds which are known in the prior art.

The compounds of formula I, it being understood that formula I includes stereoisomers, are distinguished by their blood sugar depressant activity on oral administration; thus, they are useful as hypoglycemic agents or as anti-diabetic agents. Their useful hypoglycemic properties are manifested upon administration to warm-blooded animals. For example, when 1-(2-endo-hydroxy-3-endo-D-bornyl-3-(p-toluenesulfonyl)-urea, also referred to as 1-[(1R)-2endo-hydroxy-3-endo-bornyl]-3-(p-tolylsulfonyl)-urea, which has demonstrated an $LD_{50}$ of 5,000 mg/kg. p.o. in rats is administered to dogs in doses in the range of 0.35 to 3.0 mg/kg. it causes a marked lowering of blood sugar levels over a 24-hour period as compared to controls. While the foregoing $LD_{50}$ is indeed very impressive, further studies designed to establish the absolute $LD_{50}$ of the compound, if possible, have demonstrated that it has an $LD_{50}$ of more than 16,000 mg/kg. p.o. Furthermore, the compound has effects qualitatively similar in many respects to those of 1-butyl-3-sulfanilylurea tolbutamide, well known for its therapeutic uses and properties. Thus, the 1-[(1R)-2-endo-hydroxy-3-endo-bornyl]-3-(p-tolylsulfonyl)-urea of the invention can be used in the same general manner as known hypoglycemic agents.

A compound of formula I can be used as a medicament in the form of tablets, capsules or dragees. Suitable dosage units contain from about 10 to 250 mg., preferably from about 10 to 50 mg. Suitable dosage regimens in warm-blooded animals are from about 0.15 mg/kg. per day to about 7.0 mg/kg. per day, preferably 0.2 mg/kg. per day to about 1.2 mg/kg. per day, but for any particular subject, the specific dosage regimen should be adjusted according to individual need and professional judgment of the person administering or supervising the administration of a compound of formula I.

The orally administerable pharmaceutical preparations can contain in admixture with a compound organic or inorganic carrier materials, such as, for example, lactose, starch, talc, magnesium stearate, and the like. They can also contain other active ingredients, including hypoglycemic agents.

The invention includes within its purview, the stereoisomers, encompassed by formula I, i.e., isomers differing in the position of the hydroxy group and the tosylureido moiety (endo or exo with respect to the camphane sceleton) and isomers differing with respect to the configuration of the asymmetric carbon atoms [1(R) or 1(S)]. The separation of the mixture of geometric (endo/exo) isomers can be carried out by known procedures, preferably by fractional crystallization.

The following non-limiting examples further illustrate the invention. All parts are by weight and all temperatures are in degrees centigrade, unless otherwise mentioned.

EXAMPLE 1

Preparation of 1(p-toluenesulfonyl)-3-(2-endo-hydroxy-3-endo-D-bornyl)-urea 13.6 G. of 3-endoamino-D-borneol and 19.6 g. of tosyl ethyl urethane are ground and mixed together. The mixture is heated with 4 ml. of pyridine for 5 hours on a boiling water-bath with occasional agitation. After cooling, the resulting yellow resin is dissolved in 250 ml. of 1N sodium hydroxide at room temperature. This solution is shaken out three times with 50 ml. of either and the aqueous-alkaline phase is acidified with half-conc. HCl, whereby an oil settles out. The mixture is allowed to stand at 0° for about an hour until the mother liquor is only slightly turbid. The supernatant liquid is decanted and the solidified residue is washed with about 10 ml. of water. After recrystallization from alcohol/water, 11.5 g. of 1-(p-toluenesulfonyl)-3-(2-endo-hydroxy-3-endo-D-bornyl)-urea is obtained having a decomposition point of 192°–195°; $[\alpha]_D = +63.8°$ (in ethanol).

This last-named compound can also be identified as 1-[(1R)-2-endo-hydroxy-3-endo-bornyl]-3-(p-tolylsulfonyl)-urea or by the non-proprietary name of glibornuride, and can also be represented by the structural formula:

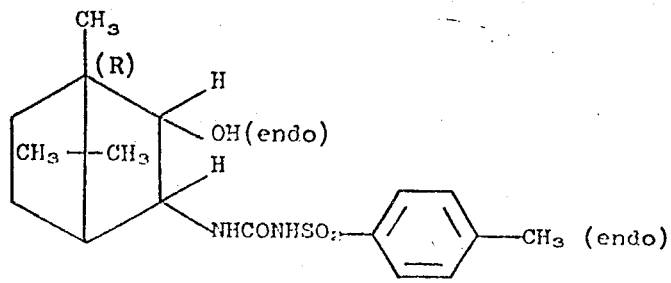

1-[(1R)-2-endo-hydroxy-3-endo-bornyl]-3-(p-tolylsulfonyl)-urea has been administered to healthy volunteers and to patients with maturity-onset diabetes. In healthy humans oral doses as low as 5 mg have caused a significant decrease in blood glucose and 10 mg of this compound had the same effect as 1,000 mg of tolbutamide. On the other side, persons without diabetes tolerated single oral doses of up to 200 mg without any other effect than lowering the blood glucose.

In particular with maturity-onset diabetes the above-mentioned compound is a highly effective antidiabetic agent. In this type of patients therapeutic trials have been performed in more than 3,000 individuals. Oral doses of 25 mg are at least as effective as 1,000 mg of tolbutamide. The individual need varies between 12,5 and 75 mg per day. In respect to general tolerance it can be stated that higher doses were given to patients with severer degrees of diabetes and it is worth mentioning that in one special investigation daily doses of 225 mg, 300 mg and even 650 mg given for several weeks were well tolerated. No. gastrointestinal side effects (no nausea, vomiting, abdominal pain) were observed.

EXAMPLE 2

Preparation of
1(p-toluenesulfonyl)-3-(2-endo-hydroxy-3-endo-D-bornyl)-urea

10 G. of 1-(p-toluenesulfonyl)-3-(3-endo-D-camphoryl)-urea are dissolved in 120 ml. of dilute caustic soda (1.4 g. of sodium hydroxide in 120 ml. of water), treated with 3 g. of sodium borohydride (about 71 percent) and stirred at 20° for 15 hours. The strongly alkaline solution is carefully acidified with dilute acetic acid, whereby, following an initial evolution of hydrogen, the desired product precipitates. The product is isolated, washed with ice-water and recrystallized from alcohol/water. After drying to constant weight, there is obtained 6.5 g. of 1-(p-toluenesulfonyl)-3-(2-endo-hydroxy-3-endo-D-bornyl)-urea.

After two recrystallizations from acetone/petroleum ether, the product has a specific rotation of $[\alpha]_D^{19} = +63.8°$ (in ethanol; c = 5) and a decomposition point of 193°.

EXAMPLE 3

Preparation of
1-(p-toluenesulfonyl)-3-(2-endo-hydroxy-3-endo-D-bornyl)-urea

1 G. of N-(p-toluenesulfonyl-carbamoyl)-endo-D-bornano[3′, 2′: 4,5]-oxazolidin-2-one is suspended in 10 ml of 1N sodium hydroxide solution and heated at reflux for 3 hours. The cooled solution is diluted with 20 ml. of water, whereby the separated oil is dissolved. The solution is then strongly acidified with 2N hydrochloric acid. The precipitate which forms is removed by filtration washed with water and recrystallized from alcohol/water to yield 1-(p-toluenesulfonyl)-3-(2-endo-hydroxy-3-endo-D-bornyl)-urea, which is identical to the product obtained in Example 1.

EXAMPLE 4

Preparation of
1-(p-toluenesulfonyl)-3-(2-endo-hydroxy-3-endo-D,L-bornyl)-urea

In an analogous manner to Example 2, through the reduction of 1-(p-toluenesulfonyl)-3endo-D,L-camphoryl-urea, there is obtained 1-(p-toluenesulfonyl)-3-(2-endo-hydroxy-3-endo-D,L-bornyl)-urea having a decomposition point of 189° (after recrystallization from acetone-petroleum ether).

EXAMPLE 5

Preparation of
1-(p-toluenesulfonyl)-3-(3-endo-hydroxy-3-endo-L-bornyl)-urea

In an analogous manner to Example 2, through the reduction of 1-(p-toluenesulfonyl)-3-(3-endo-L-camphoryl)-urea, there is obtained 1-(p-toluenesulfonyl)-3-(3-endo-hydroxy-3-endo-L-bornyl)-urea having a decomposition point of 193°: $[\alpha]_D^{18} = -62.5°$ (ethanol, c = 4).

EXAMPLE 6

Preparation of
1-(p-toluenesulfonyl)-3-(2-exo-hydroxy-3-endo-D-bornyl)-urea

1 G. of endoamino-D-isoborneol, 1.3 g. of tosyl ethyl urethane and 12 drops of absolute pyridine are heated on a boiling water-bath with occasional agitation for 7 hours. The reaction mixture is thereafter dissolved in 30 ml. of 0.5N sodium hydroxide. The resulting solution is extracted with two 20 ml. portions of ether and the aqueous phase is acidified with half-conc. hydrochloric acid. The product which separates out is taken up in ether. The residue obtained following evaporation of the etheral solution yields, when recrystallized from acetone/petroleum ether, 0.75 g. of 1-(p-toluenesulfonyl)-3-(2-exo-hydroxy-3-endo-D-bornyl)-urea, having a melting point of 158°; and $[\alpha]_D^{20} = +34.4°$ (c = 3 in methanol).

EXAMPLE 7

Preparation of
1-(p-toluenesulfonyl)-3-(3-endo-D-camphoryl)-urea

26 Ml. of p-tosyl isocyanate are added dropwise with stirring to a solution of 20.3 g. of 3-endoamino-D- camphor hydrochloride in 150 ml. of absolute dimethylformamide. The reaction mixture warms to about 40°. After cooling to 20°, 28 ml. of absolute triethylamine are added dropwise over a half hour period, whereby the reaction mixture once again warms to about 40°. It is cooled and stirred at 20° for an additional 15 hours. The dimethylformamide and the excess of triethylamine are removed under vacuum. The remaining semi-solid residue is treated with 500 ml. of 0.5N sodium hydroxide and shaken until dissolved. This solution is shaken out with two 100 ml. portions of ether, filtered and acidified with dilute hydrochloric acid. The precipitate that forms is removed by filtration, washed with ice-water, pressed out and recrystallized from methanol/water (about 300 ml. of methanol and 50 ml. of water). After vacuum drying at 100° to a constant weight, there is obtained 24.4 g. of 1-(p-toluenesulfonyl)-3-(3-endo-D-camphoryl)-urea (67 percent of the theory), having a decomposition point of 190°. $[\alpha]_D^{19} = -17.7°$.

EXAMPLE 8

Preparation of 1-(p-toluenesulfonyl)-3-(3-endo-D-camphoryl)-urea

1 G. mixture of 3-endo-tosylureido-D-borneol-isoborneol isomers (according to specific rotation, 58 percent cis and 42 percent trans) is dissolved in 10 ml. of absolute acetone and treated dropwise with stirring at room temperature with an amount of chromic acid standard solution (26.7 g. of chromium trioxide dissolved in 23 ml. of conc. $H_2SO_4$ and sufficient water to make 100 ml. of solution) sufficient to color the supernatant solution orange-brown. Thereafter, the reaction mixture is diluted with 80 ml. of water to dissolve the green chromium salts present. The crystalline oxidation product is removed by filtration, washed well with water and recrystallized from methanol/water to yield 0.83 g. (83 percent of the theory) of 1-(p-toluenesulfonyl)-3-(3-endo-D-camphoryl)-urea. The IR spectrum of the product is identical with that of the product obtained in accordance with Example 7.

Example 9

Preparation of 1-(p-toluenesulfonyl)-3-(3-endo-D-camphoryl)-urea 1.06 G. of sodium p-toluenesulfonamide are suspended in 30 ml. of absolute dimethylformamide and treated at 20° with 0.97 g. of D-camphoryl-(3) isocyanate with stirring until dissolved. The resulting solution is stirred at 20° for an additional 15 hours. The solvent is evaporated and the oily residue is dissolved in 20 ml. of 0.5N caustic soda. The resulting alkaline solution is acidified with dilute hydrochloric acid, whereby the product precipitates. The precipitate is isolated, washed with water and recrystallized from methanol/water to yield 1.6 g. (88 percent of the theory) of 1-(p-toluenesulfonyl)-3-(3-endo-D-camphoryl)-urea, having a decomposition point of 190°.

EXAMPLE 10

Preparation of 1-(p-toluenesulfonyl)-3-(3-endo-L-camphoryl)-urea

In an analogous manner to Example 2, 15 g. of 3-endo-amino-L-camphor D-camphor-10-sulfonate are reacted with 15 ml. of p-tosylisocyanate to yield 10.4 g. of 1-(p-toluenesulfonyl)-3-(3-endo-L-camphoryl)-urea, having a decomposition point of 190°; $[\alpha]_D^{19} = +17.5°$ (in chloroform, c = 3).

The 3-endo-amino-L-camphor D-camphor-10-sulfonate can be prepared according to the following procedure:

In a manner analogous to that of the J. Org. Chem. 28, 304 (1963), 3-isonitroso-L-camphor is prepared from L-camphor. According to the procedure of Example 18, paragraph 2, 3-endo-amino-L-camphor is obtained therefrom as a crude product in ethereal solution. The ethereal solution is reacted with methanolic solution of D-camphor-10-sulfonic acid whereby the salt precipitates. The resulting 3-endo-amino-L-camphor D-camphor-10-sulfonate has a decomposition point of 199°; $[\alpha]_D^{19} = 14.8°$ (in methanol, c = 6).

EXAMPLE 11

Preparation of N-(p-toluenesulfonyl-carbamoyl)-endo-D-bornano-[3',3':4,5]-oxazolidin-2-one A suspension of 20 g. of endo-D-bornano-[3',2':4,5]-oxazolidin-2-one in 100 ml. of absolute xylene is heated at reflux with 24 ml. of p-toluenesulfonylisocyanate for a period of 3 hours. The xylol is thereafter evaporated, and the residue is extracted several times with a total of 200 ml. of ,2'and thereafter recrystallized to yield N-(p-toluenesulfonyl-carbamoyl)-endo-D-bornano-[3',2':4,5]-oxazolidin-2-one having a decomposition point of 155°, $[\alpha]_D$ 155° (chloroform, c = 3) from acetone/petroleum ether.

The starting material can be prepared according to the following procedure:

To a suspension of 70 g. of 3-endoamino-D-borneol and 140 g. of lead carbonate in 200 ml. of toluene are slowly dripped with stirring 280 ml. of a 20 percent solution of phosgene in toluene. Upon completion of the reaction, the mixture is stirred for an additional hour, filtered and the filtrate is washed with hot toluene. The filtrate is evaporated and the residue recrystallized from acetone-petroleum ether to yield endo-D-bornano-[3',2':4,5]-oxazolidin-2-one which decomposes at 168°, $[\alpha]_D$ +87° (alcohol, c = 3).

EXAMPLE 12

Preparation of 1-(p-toluenesulfonyl)-3-(3-endo-D,L-camphoryl)-urea 13.5 G. of 3-endo-amino-D,L-camphor hydrochloride are reacted with 15 ml. of p-tosylisocyanate according to the procedure of Example 2 to yield 15.3 g. of 1-(p-toluenesulfonyl)-3-(3-endo-D,L-camphoryl)-urea having a decomposition point of 164°.

The 3-endo-amino-D,L-camphor hydrochloride can be prepared according to the following procedure:

15 G of isonitroso-D,L-camphor are dissolved in 120 ml. of sodium hydroxide solution (15 g. sodium hydroxide). The solution is charged with 18 g. of zinc dust. The resulting oily 3-endo-amino-D,L-camphor is dissolved in ether, and the ethereal solution is dried with potassium carbonate. Thereafter, the solution is treated to a strong acetic reaction with ether saturated with hydrochloric acid. The resulting precipitate is separated and washed with divided portions of ether, to yield 13.5 g. of 3-endo-amino-D,L-camphor hydrochloride having a decomposition point of 227°.

EXAMPLE 13

Tablets of the following composition are prepared utilizing conventional procedures:

| | | |
|---|---|---|
| 1-(p-toluenesulfonyl)-3-(2-endo-hydroxy-3-endo-D-bornyl)-urea | 50 | mg. |
| Avicel | 90 | mg. |
| Corn Starch | 9.9 | mg. |
| Magnesium Stearate | 0.1 | mg. |
| Total | 150 | mg. |

We claim:

1. A method of lowering blood sugar levels in warm-blooded animals in need thereof which comprises administering orally to said warm-blooded animals an effective amount of a compound of the formula

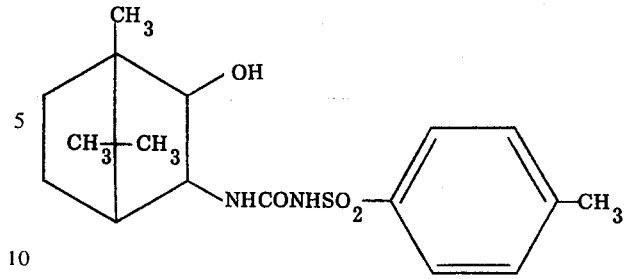

2. The method of claim 1, wherein the compound administered is 1-[(1R)-2-endo-hydroxy-3-endo-bornyl]-3-(p-tolylsulfonyl)urea.

* * * * *

PO-1050
(5/69)

UNITED STATES PATENT OFFICE
CERTIFICATE OF CORRECTION

Patent No. 3,860,724                Dated January 14, 1975

Inventor(s) Hermann Bretschneider et al.

It is certified that error appears in the above-identified patent and that said Letters Patent are hereby corrected as shown below:

Cover page, insert

[30] Foreign Application Priority Data

| October 28, 1966 | Switzerland | 15651/66 |
| July 17, 1967 | Switzerland | 10187/67 |
| April 24, 1967 | Switzerland | 5822/67 |

Signed and sealed this 15th day of April 1975.

(SEAL)
Attest:

RUTH C. MASON
Attesting Officer

C. MARSHALL DANN
Commissioner of Patents
and Trademarks